United States Patent [19]

Allen

[11] 4,017,152
[45] Apr. 12, 1977

[54] PORTABLE PROJECTION SCREEN
[76] Inventor: William P. Allen, P.O. Box 702, Portland, Oreg. 97207
[22] Filed: May 14, 1975
[21] Appl. No.: 577,230
[52] U.S. Cl. .............................. 350/117; 248/165
[51] Int. Cl.² ....................................... G03B 21/56
[58] Field of Search .......... 350/117; 35/53; 40/214; 248/165

[56] References Cited
UNITED STATES PATENTS 2,968,033   1/1961   Kreitzberg ..................... 350/117 X
3,255,988   6/1966   Albee, Jr. ...................... 350/117 X

FOREIGN PATENTS OR APPLICATIONS 728,913   3/1966   Canada ............................ 350/117

*Primary Examiner*—Richard A. Wintercorn
*Attorney, Agent, or Firm*—Kolisch, Hartwell, Dickinson & Stuart

[57] ABSTRACT

A portable projection screen including a sheet of flexible material and a collapsible support for the sheet. The support includes a central hub member having a plurality of sockets therein. Multiple extensible-contractible rods fit at one set of their ends in the hub member and radiate outwardly therefrom. The outer ends of the rods are received in connectors secured to edge margins of the sheet, and when the rods are extended they tense the sheet into a substantially planar surface. A collapsible mast is provided for supporting the screen above a horizontal surface, or for hanging it on a wall.

18 Claims, 18 Drawing Figures

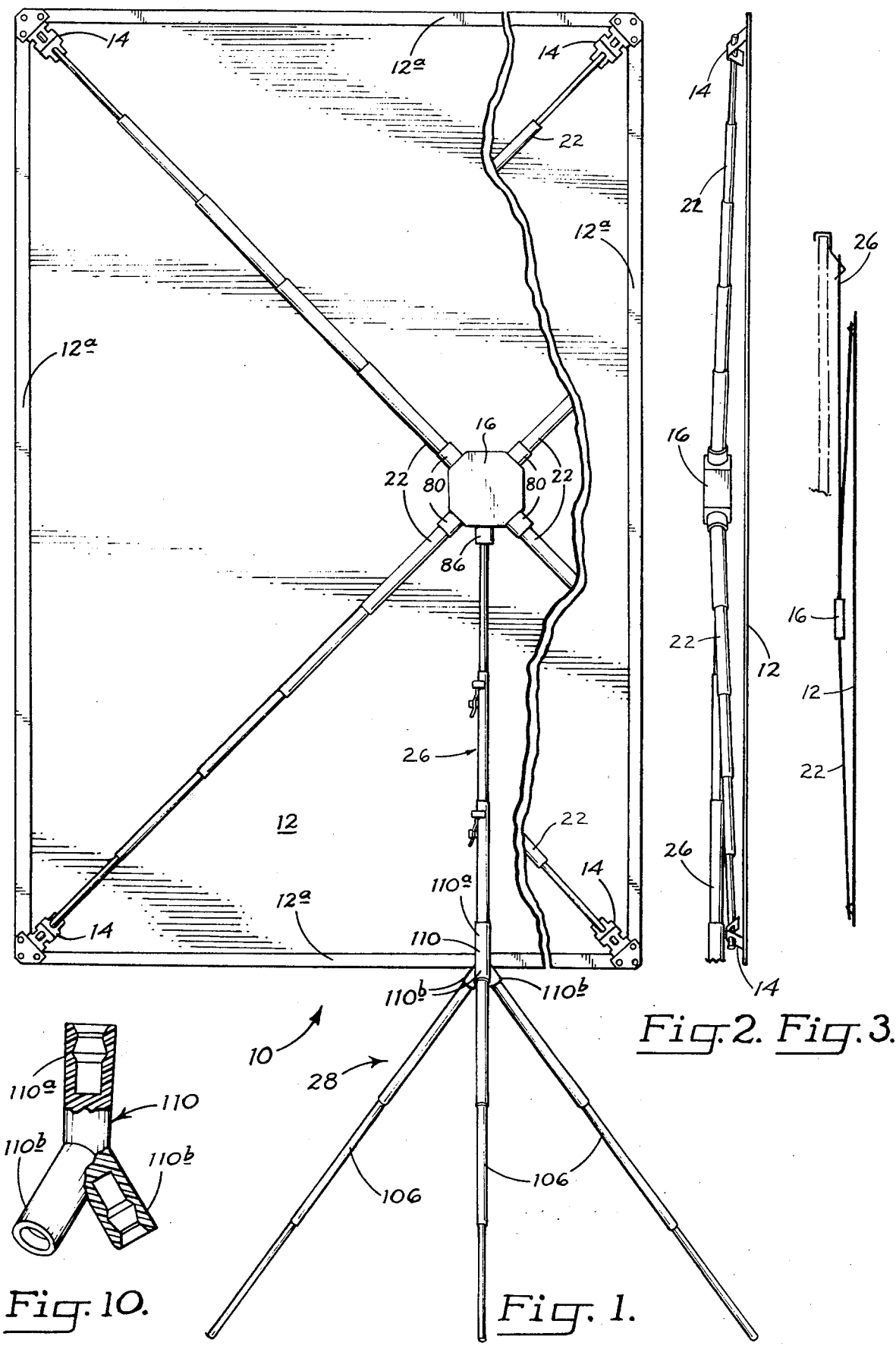

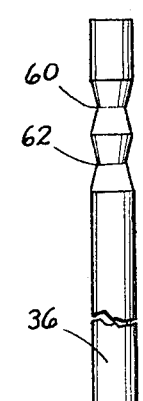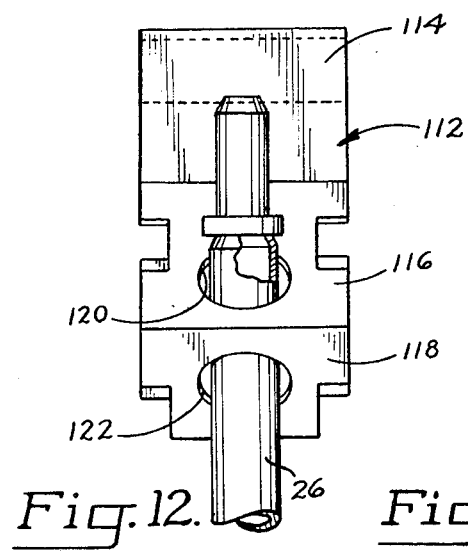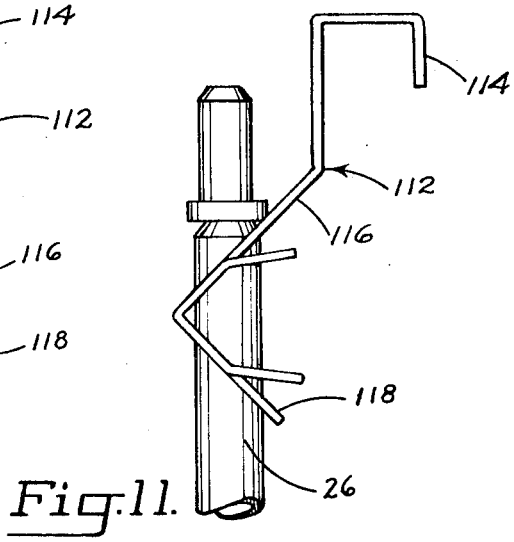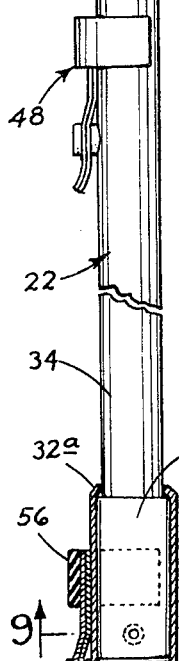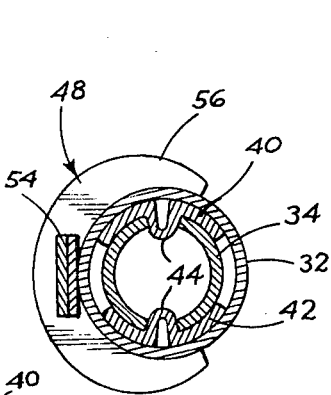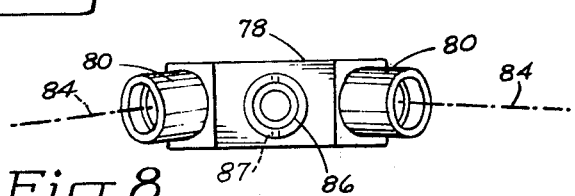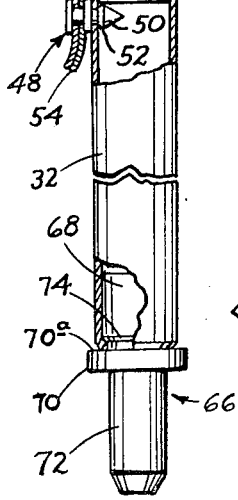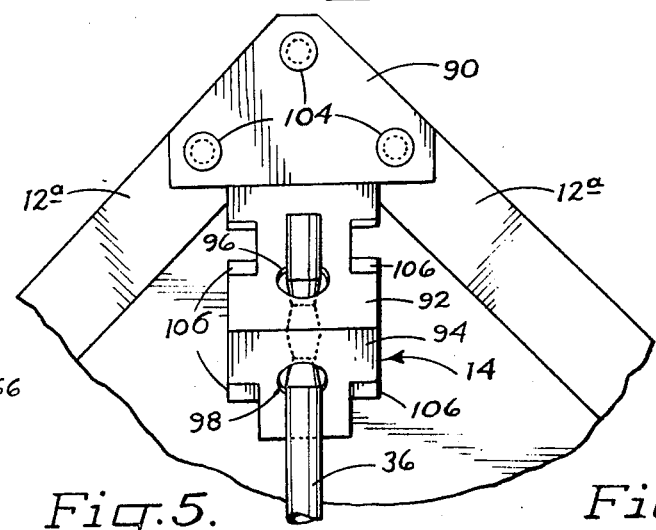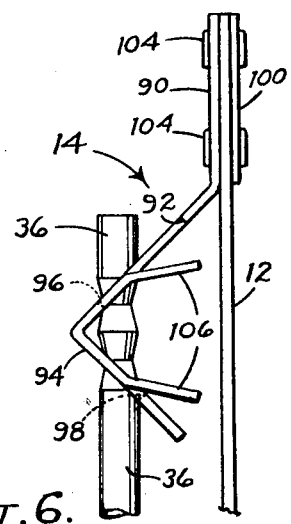

PORTABLE PROJECTION SCREEN

BACKGROUND AND SUMMARY OF THE INVENTION

This invention pertains to a portable projection screen, and more particularly, to such a screen which includes a collapsible support.

Various portable projection screens have been devised in the past. However, for the most part, these have been either unnecessarily bulky and heavy or they do not provide sufficient stability and support for properly tensing and holding the screen.

A general object of the present invention, therefore, is to provide an improved portable projection screen which overcomes these disadvantages of prior devices in a practical and satisfactory manner.

More specifically, an object of the invention is to provide such a screen which is lightweight and collapsible to such an extent that it can be conveniently packed and carried in a small case.

Another object is to provide such a novel portable screen which, although light in weight and collapsible, provides adequate support and stability for a sheet forming the reflective surface for the screen.

Yet another object is to provide such a portable projection screen which is simply and economically constructed.

More specifically, the invention includes a flexible sheet, a central hub having a plurality of rod attaching means thereon and multiple telescopic rods which connect to such attaching means and radiate outwardly from the hub member. The sheet has connectors adjacent its edge margin for receiving and holding outer ends of the rods, and when the rods are extended, they serve to tense the sheet whereby the same provides a substantially planar reflective surface.

A still further object of the present invention is to provide a novel spring clip for connecting outer ends of the telescopic rods to the sheet in such a portable projection screen.

These and other objects and advantages will become more fully apparent as the following description is read in conjunction with the drawings, wherein:

FIG. 1 is a rear view of a projection screen constructed according to an embodiment of the invention in an operative position with a portion broken away and one side compressed;

FIG. 2 is a side elevation view, of the screen of FIG. 1;

FIG. 3 is a side elevation view, on a reduced scale illustrating how the screen could be hung on a wall;

FIG. 4 is an enlarged view of a telescopic rod forming a portion of the support for a flexible sheet forming the screen, with portions broken away;

FIg. 5 is an enlarged view of a spring clip connector for connecting a telescopic rod to a corner of the screen;

FIG. 6 is a side elevation view of the connector illustrated in FIG. 5;

FIG. 7 is an enlarged view of a central hub member into which the telescopic rods are inserted and from which they radiate to support the screen;

FIG. 8 is a side view of the hub member;

FIG. 9 is an enlarged cross-sectional view taken generally along the line 9—9 of a portion of the telescopic rod illustrated in FIG. 4;

FIG. 10 is an enlarged view of a connector member used in providing a tripod support stand for the screen;

FIG. 11 is a side elevation view of a support hanger used to suspend the screen from a wall as illustrated in FIG. 3;

FIG. 12 is a rear view of the hanger illustrated in FIG. 11;

DETAILED DESCRIPTION OF AN EMBODIMENT OF THE INVENTION

Figure 13:
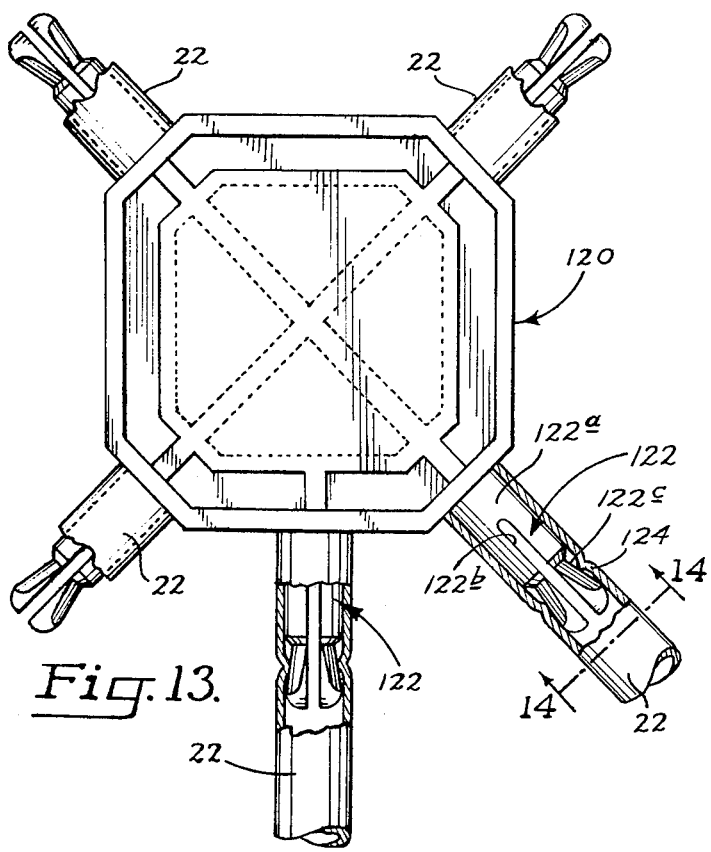
FIG. 13 is a view of another embodiment of a central hub member for holding inner ends of the rods.
Figure 14:
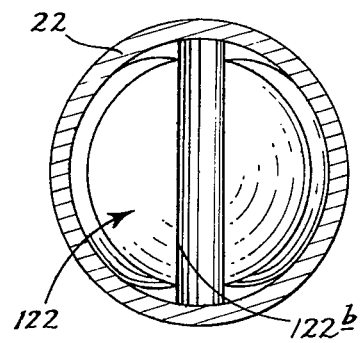
FIG. 14 is an enlarged cross-sectional view taken generally along line 14—14 in FIG. 13 illustrating an interconnection between a telescopic rod and the hub.

Turning now to the drawings, and referring first specifically to FIG. 1, at 10 is indicated generally a portable projection screen constructed according to an embodiment of the invention. Speaking generally, the projection screen includes a substantially rectangular sheet of flexible, reflective material 12, a plurality of spring clip connectors 14 secured in each corner of the sheet, a central hub member 16, a plurality of extensible-contractible telescopic rods 22 radiating outwardly from hub member 16 and supporting the corners of sheet 12, an upright support mast 26 and a tripod base 28.

Sheet 12 is a flexible sheet of light reflective material, such as a white polyester knit material which if folded into a compact size for packing and carrying can be unfolded later for use with minimal, if any, creasing having occurred. The marginal edges of the sheet have been folded over into a hem 12a.

Referring to FIG. 4, a telescopic rod 22 is illustrated in greater detail. As is seen in FIG. 4, rod 22 includes a plurality of elongate tubular elements which are operatively connected for extension and retraction relative to each other to permit lengthening and shortening of the rod. In FIG. 4, tubes 32, 34, 36, of successively decreasing diameter are illustrated, with tube 36 telescopically received wiithin the tube 34 and tube 34, in turn, telescopically received in tube 32.

As is seen in the broken away portion of FIG. 4, the end of a tube which slidably receives another tube therein is crimped inwardly, as illutrated as 32a for tube 32, to produce a sliding fit with the outer surface of received tube 34.

Interposed between the inner surface of tube 32 and the outer surface of tube 34 are a pair of elongate, arcuate copper shims 40, 42 which are disposed on diametrically opposite sides of the end of tube 34 slidably received in tube 32 (see FIGS. 4 and 9). Shims 40, 42 are connected to tube 34 by projections 44 thereon which extend through accommodating bores in tube 34 to secure them against movement longitudinally of tube 34. The thickness of shims 40, 42 is sufficient to permit a tight sliding fit between the tubes to inhibit lateral shifting of the tubes and to provide for frictional holding of the tubes in selected adjusted positions relative to each other. This aids in rigidifying the structure, and produces sufficient friction within the system to maintain the tubes in selected longitudinally adjusted positions relative to each other. The interconnection between other tubes in the rod is similar to that just described.

At 48 are indicated generally stops for locking a pair of tubes in fully extended position relative to each other. A stop includes, as is illustrated in the broken away portion of FIG. 4, a flexible stop element 50 having a pointed end for insertion through an accommodating bore 52 in its associated tube. Insertion of the stop element into tube 32 as illustrated in FIG. 4 prevents retraction of tube 34 therein. Stop element 50 is held on the tube during periods of nonuse by a flexible strap 54 which is clipped to the tube by a collar 56.

A section of tube 36, adjacent what is referred to herein as the outer end of a rod, is crimped in such a manner as to provide two axially spaced indentations 60, 62 extending about the outer end portion of the tube.

The opposite, or inner, end of the tube has a cylindrical insert 66 secured therein. Insert 66 has an inner portion 68 which fits tightly within tube 32, a shoulder portion 70 of greater diameter than tube 32, and an outer portion 72 of a smaller diameter than shoulder portion 70. The end of tube 32 is crimped inwardly into a shallow channel 74 intermediate shoulder portion 70 and inner portion 68 to secure the insert to the tube. Since shoulder portion 70 has a greater diameter than tube 32 a face 70a thereon projects radially outwardly from the outer surface of the tube and faces axially inwardly along the tube.

Referring to FIGS. 7 and 8, hub 16, which may be formed of a molded plastic material, has a substantially planar central portion 78 with a plurality of angularly disposed sockets 80 spaces thereabout. Each of the sockets has generally the configuration illustrated in the broken away portion of FIG. 7. As is seen, a socket includes an inner portion 80a into which outer portion 72 of an insert 66 may snugly fit. Adjacent the mouth of the bore is a shoulder 80b of slightly smaller diameter than the diameter of shoulder portion 70a on the insert. With the inner end of a tube received in a bore, as illustrated in FIG. 7, shoulder portion 70 on the insert is positioned inwardly of shoulder 80b in the socket to inhibit removal of the rod from the hub member. Since the hub is made of a plastic material, it does permit release of the rod on sufficiently pulling force being applied. In FIG. 8 lines 84 denote the center lines of the sockets. As is seen, they are disposed at a low, or shallow, angle relative to the plane of the hub member. The purpose for this shallow, or low, angle will be explained later.

Another socket 86, somewhat similar to those just described, is positioned intermediate a pair of sockets 80. The interior of socket 86 is formed substantially the same as those just described. Socket 86, however, is not disposed at an angle to the plane of hub member 78, and it has a bore 87 extending laterally through its side walls.

In initially setting up the screen, the inner ends of rods 22 are inserted into sockets 80 as illustrated in FIGS. 1 and 7. The rods radiate outwardly therefrom and are disposed at a low angle relative to the center hub member as illustrated in FIG. 2. With the rods extended to the same lengths, their outer ends occupy a substantially common plane.

Referring to FIGS. 5 and 6, a connector 14 will be described in greater detail. As is seen a connector 14 includes a formed assembly of spring steel, or flexible plastic material. It includes a planar, substantially triangular connecting portion 90, a first substantially planar leg portion 92, and a second leg portion 94 disposed at a substantial angle relative to leg portion 92. A pair of bores 96, 98 extend through legs 92, 94, respectively, with the axis of each bore substantially perpendicular to the plane of its associated leg portion. In operative position, one face of portion 90 is against a corner of sheet 12, and leg portions 92, 94 are spaced from the sheet. A clamp plate 100, having a shape similar to connecting portion 90, is disposed on the opposite side of the corner of sheet 12 from connecting portion 90. Accommodating bores in connecting portion 90 and plate 100, and holes in appropriate positions in the corner of sheet 12 receive rivets 104 therethrough to connect the spring clip connector to the sheet.

Bores 96, 98 are of such size and are so positioned in the connector that when a squeezing force is applied to leg portions 92, 94 to urge them to move from the normally angularly disposed relationship, as illustrated, into a more nearly parallel position than that shown in the illustrations, the bores are sufficiently aligned to receive the outer end of rod 22 therethrough. With the rod end in position, as illustrated in FIGS. 5 and 6, release of the pressing force on the leg portions allows them to be biased toward their normal angularly disposed positions to frictionally grip the rod therein. Indentations 60, 62 are so positioned on tube 36 that they receive edge margins of bores 96, 98 further to aid in holding the tube in the clip.

Extensions 106 on opposite sides of leg portions 92, 94 provide convenient means for gripping the clip for urging the opposed leg portions toward each other to receive or release the rod end.

Describing mast 26, the same includes a plurality of telescopic tubular members, much like those previously described with regard to a rod 22. Mast 26 also includes the same style of shims and stop elements 50 for holding the tubular members in selected adjusted positions relative to each other as previously described with relation to a rod 22.

Tripod 28 includes three extensible-contractible, telescopic legs 106 which are connected to mast 26 through a connector 110. As is seen in FIGS. 1 and 10, connector 110 includes an elongate cylindrical upper portion 110a and three lower cylindrical portions 110b which are disposed at substantial angles relative to each other and at substantial angles relative to upper portion 110a. Upper portion 110a and lower portions 110b all have sockets therein which have generally the configuration as previously described for a socket 80 in the central hub member. Each socket is adapted to receive and hold a tube with an insert similar to insert 66 in a manner as previously described for a telescopic rod as held in a socket 80.

Describing the operation of a portable projection screen as described in relation to FIGS. 1–10, to assemble the same, the inner ends of rods 22 are inserted in the four angularly disposed sockets 80 of the central hub member. The outer ends of rods 22 are connected to spring clip connectors 14 at the corners of sheet 12 by squeezing leg portions 92, 94 of the clip connector together and inserting the outer end of the rod therethrough to the position illustrated in FIGS. 5 and 6, after which the pressing force on legs 92, 94 is released to frictionally hold the rod in the connector. Rods 22 then are telescopically extended to the positions illustrated in FIGS. 1 and 2 to tense the sheet and form it into a substantially planar reflective surface. As is seen in FIG. 2, with the rods thus extended, they project at a low angle from center hub member 16 whereby sheet 12 is spaced forwardly from the hub so that the hub does not produce a bulge in the screen.

Mast 26 is extended and locked into position. Both ends of mast 26 have inserts similar to that illustrated at 66 in FIG. 4 secured thereto. One end of mast 26 is inserted into socket 86 of the center hub member and its other end is inserted in the socket in upper portion 110a of connector 110. Telescopic legs 106 are extended and are inserted into the sockets in lower portions 110b of the connector. With the tripod legs thus extended they form a stable base and support for the tensed screen as illustrated in FIGS. 1 and 2.

To disassemble the projection screen, the reverse operation is accomplished. Mast 26 and tripod 28 are removed from center hub 16, with legs 106 and mast 26 then being removed from connector 110. After removal, they may be collapsed for compact packing. Telescopic rods 22 than are retracted to provide sufficient slack in sheet 12 whereby spring clips 14 may be released from the ends of the rods and the sheet then is folded for packing. Rods 22 are removed from center hub member 16 and completely collapsed, or retracted, for compact packing. All of the elements in their collapsed and folded state will pack compactly into a small, easily carried case.

Referring to FIGS. 11 and 12, a hanger 112 is illustrated for hanging the screen as illustrated in FIG. 3. The hanger includes a hook portion 114 which can be hooked over the top of a wall, as illustrated in FIG. 3, or may have a notch formed therein to hang on a picture hanger. The hanger includes angularly disposed leg portions 116, 118 with bores 120, 122 extending therethrough. The legs and bores operate in much the same manner as leg portions 92, 94 and bores 96, 98 previously described with regard to connectors 14.

In operation of the hanger one end of mast 26 is extended through bores 120, 122 and frictionally gripped therein. The screen then may be hung as illustrated in FIG. 3.

Referring to FIGS. 13–18, illustrated in these figures, are modified embodiments of elements in the screen assembly. Referring specifically to FIG. 13, at 120 is indicated a modified central hub corresponding to previously described hub 16. In this modified form, however, the hub has projections 122 projecting radially outwardly therefrom in circumferentially spaced locations. Projections 122 are disposed at a low angle relative to the major portion of the hub in much the same manner as previously described for sockets 80. A projection 122 is adapted to be received in the hollow inner end of a rod 22, as illustrated in FIG. 13.

Describing a projection 122 in detail, it includes a cylindrical portion 122a having an outer diameter substantially equal to the inner diameter of the hollow inner end of rod 22. The outer end of projection 122 is split at 122b so that it may flex inwardly. A necked down portion 122c is provided intermediate the ends of projection 122, and the outer end portions of projection 122 flare outwardly on projectiong outwardly from necked down portion 122c. A crimp 124 is provided in rod 22 which produces a portion projecting radially inwardly of the tube to engage the outwardly flared portions of projection 122 when the rod is received thereon.

When a rod 22 is to be slipped onto a projection 122 the rounded outer end of projection 122 guides the rod onto the projection. Crimp 124 forces the spaced-apart, opposed portions of projection 122 to move toward each other allowing the crimp to slip over the outer end of the projection. When the tube is finally in the position illustrated in FIG. 13 it is releasably held on the projection by the interaction of crimp 124 and the outwardly flared portions of projection 122.

Figure 15:
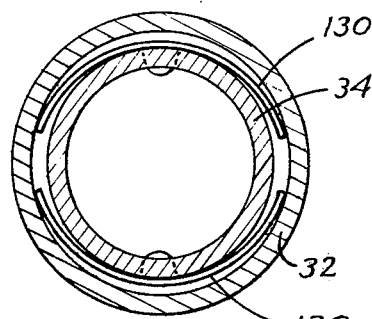
FIG. 15 is an enlarged cross-sectional view taken generally along a line similar to line 9—9 in FIG. 4 illustrating a modified form of frictional interconnection between telescopic members in a rod.

Referring to FIG. 15, a modified form of frictional interconnection between tube sections such as 32 and 34 is illustrated. In this embodiment, a pair of arcuate friction springs 130 are disposed on diametrically opposite sides of the end of tube 34 slidably received in tube 32. Springs 130 are connected to tube 34 by projections which extend through accommodating bores in tube 34. As is seen, springs 130 are thinner than the distance between the outer diameter of tube 34 and the inner diameter of tube 32. However, the radius of curvature of springs 130 is greater than the radius of curvature of the inner surface of tube 32, whereby the outer end margins of the springs flare outwardly from tube 34 to frictionally bear against the inner surface of tube 32. This provides a frictional holding force between the tubes to maintain them in a selected adjusted position as they are shifted telescopically relative to each other.

Figure 16:
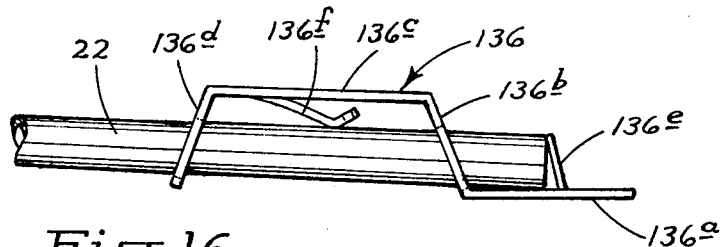
FIGS. 16 and 17 are side and plan views, respectively, of a modified spring clip connector for connecting a telescopic rod to a corner of the screen.
Figure 17:
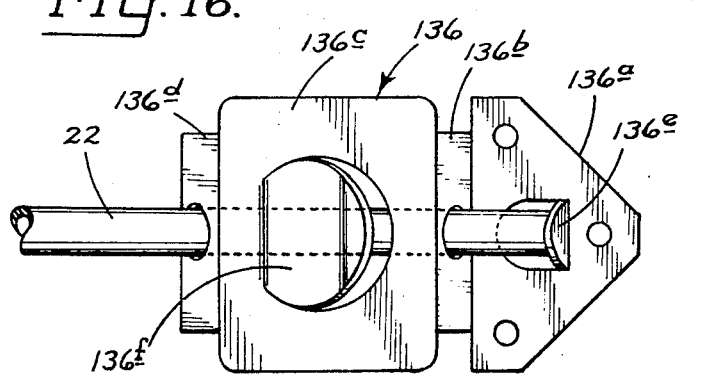

Referring to FIGS. 16 and 17, a modified form of spring clip 136 for connecting an outer end of a rod 22 to screen 12 is illustrated. As is seen the spring clip includes a flat sheet of spring material, either metal or plastic, which has been formed to the shape illustrated. The clip, or connector, includes a blunted arrowhead shaped portion 136a for securing to the corner of the screen, a fist leg portion 136b projecting upwardly at a substantial angle therefrom, a planar central portion 136c parallel to portion 136a, and a second leg portion 136d projecting at a substantial angle downwardly from central portion 136c. Leg portions 136b, 136d each have a bore extending therethrough of sufficient size to receive the outer end of rod 22 therethrough. A bent-up portion 136e extending at a substantial angle upwardly from portion 136a provides a stop for the end of rod 22. A friction spring portion 136f cut from central portion 136c is bent downwardly therefrom into the position illustrated in FIG. 16, whereby the same frictionally bears against the side of rod 22 to hold the same therein.

Connectors such as that illustrated at 136 are secured to corners of sheet 12 in much the same manner as previously described connectors 14. The end of a rod 12 is slipped through the bores in leg portions 136b, 136d and against stop portion 136e. Portion 136f bearing against the side of rod 22 holds the same therein. There is no need for crimping the end of the rod as previously described with relation to a holder as illustrated at 14.

Figure 18:
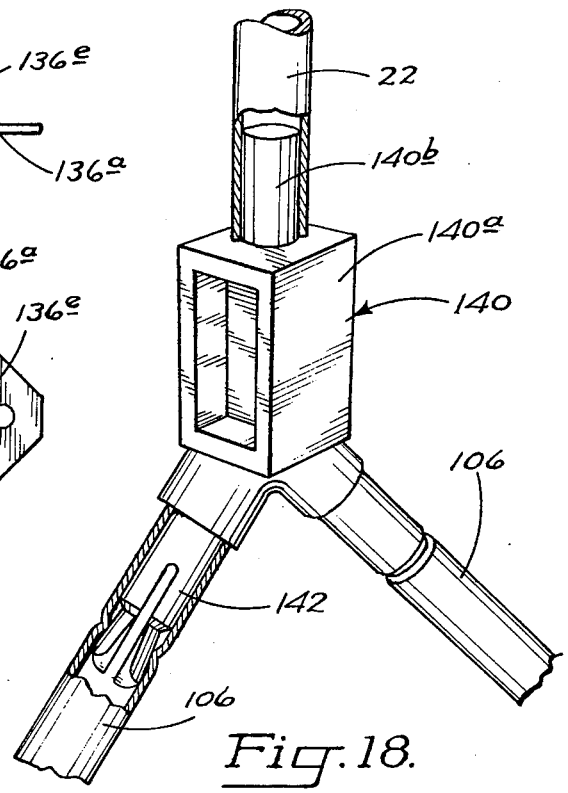
FIG. 18 is an enlarged view of a connector member used in providing a tripod support stand for the screen in a modified embodiment of the invention.

In FIG. 18 is illustrated a modified form of tripod connector 140. It includes a central boxlike portion 140a from the top of which projects an upstanding cylindrical post 140b adapted to receive the hollow end of a rod 22 thereover.

Three angularly disposed projections, such as that illustrated at 142, each being similar to that previously described at 122, project downwardly from central portion 144 to receive the hollow inner ends of legs 106 thereon. The legs are held thereon in much the same manner as previously described for the holding of rods 22 on projections 122.

While a preferred embodiment of the invention has been described herein, it should be apparent to those skilled in the art that variations and modifications are possible without departing from the spirit of the invention.

It is claimed and desired to secure by letters patent:

1. A portable projection screen comprising
   a sheet of flexible material, and
   sheet support means including a central hub member,
   at least three elongate rods having inner and outer ends, means on said hub member of detachably connecting the inner set of ends of said rods to said hub member with said members radiating outwardly therefrom at substantial angles relative to each other and with the outer set of ends of said rods occupying a substantially common plane, spaced-apart connector means on said sheet adjacent marginal edges thereof for releasably connecting outer end portions of said rods to said sheet, said connector means being so positioned on the sheet that when said rod ends are connected thereto in operative positions the sheet is tensed, and said sheet being collapsible upon release of said rods from said connector means.

2. The screen of claim 1, wherein a rod comprises at least a pair of elongated, substantially parallel rod elements operatively connected to each other for longitudinal shifting relative to each other to permit extension and retraction of said rod.

3. The screen of claim 2, which further comprises holding means for holding said rod elements in selected adjusted positions relative to each other.

4. The screen of claim 2, wherein one of said rod elements is telescopically received in the other of said rod elements.

5. The screen of claim 1, wherein said connector means comprises a spring clip secured to said sheet adapted to receive an outer end portion of a rod and frictionally hold the same.

6. The screen of claim 1, wherein said sheet is multi-angular and said connector means are secured to said sheet at corners thereof.

7. The screen of claim 1, wherein said means for detachably connecting the inner set of ends of the rods to the hub member comprises a plurality of sockets formed in said hub member, each of which sockets is adapted to receive an inner end of a rod.

8. The screen of claim 1, wherein said support means further comprises an extensible-contractible mast, means on said hub member for detachably connecting an end of said mast to said hub member, and means connected to the opposite end of said mast for supporting the same in a substantially upright position with the face surface of said sheet substantially vertical.

9. The screen of claim 1, wherein a rod is hollow at its inner end, and said means for detachably connecting the inner end of the rod to the hub member comprises an elongate projection extending radially outwardly from said hub on which said inner end of the rod is detachably received.

10. A portable projection screen comprising
    a sheet of flexible material, and
    sheet support means including a central hub member,
    at least three elongate, extensible-contractible rods having inner and outer ends, means on said hub member for detachably connecting the inner set of ends of said rods to said hub member with said rods radiating outwardly therefrom at substantial angles relative to each other with the outer set of ends of said rods occupying a substantially common plane, and spaced-apart connectors on said sheet adjacent marginal edges thereof for connecting outer end portions of said rods to said sheet, a connector comprising a spring clip secured to said sheet adapted to receive an outer end portion of a rod and frictionally hold the same therein and being so positioned on the sheet that the sheet is tensed when said rod ends are connected thereto and the rods are extended.

11. The screen of claim 10, wherein a rod comprises at least a pair of elongate substantially parallel rod elements operatively connected to each other for longitudinal shifting relative to each other to permit extension and retraction of said rod, and which further comprises holding means for holding said rod elements in selected adjusted positions relative to each other.

12. The screen of claim 10, wherein said spring clip comprises a pair of gripping legs normally biased to positions in angularly disposed relationship to each other, which legs are shiftable on the application of force thereto toward a more nearly parallel relationship, and upon release of such force are urged toward said normal angularly disposed relationship, said gripping legs having openings extending therethrough which, when said legs are shifted toward said more parallel relationship, are sufficiently aligned to receive a rod therethrough and upon release frictionally grip said rod to hold the same therein.

13. A portable projection screen comprising
    a sheet of flexible material, and
    sheet support means including a central hub member,
    at least three elongate telescopic rods, each having inner and outer ends shiftable to different adjusted positions relative to each other on extension and retraction of the rod, holding means for maintaining a rod in a selected adjusted position, means on said hub member for detachably connecting the inner set of ends of said rods to said hub member with said rods radiating outwardly therefrom at substantial angles relative to each other and with the outer set of ends of said rods occupying a substantially common plane, spaced-apart connector means on said sheet adjacent marginal edges thereof for releasably connecting outer end portions of said rods to said sheet and being so positioned on the sheet that the sheet is tensed when said rod ends are connected thereto and extended.

14. The screen of claim 13, wherein said means on said hub member for detachably connecting the rods thereto comprises a plurality of sockets disposed in a substantially common plane with the axis of each socket disposed at a low angle relative to said plane, whereby said rods on radiating outwardly from said hub member are disposed at a low angle to said plane and said sheet when tensed on said rods is spaced from the hub member.

15. The screen of claim 13, wherein said rods are hollow at their inner ends, and said means for detachably connecting the inner ends of the rods to the hub member comprises a plurality of elongate projections disposed in a substantially common plane and extending radially outwardly from said hub, on which projections the inner ends of the rods are detachably received, with the axis of each projection disposed at a low angle relative to said plane, whereby said rods on radiating outwardly from said hub member are disposed at a low angle to said plane and said sheet when tensed on said rods is spaced from the hub member.

16. A portable projection screen comprising a sheet of flexible material, and sheet support means including a central hub member, at least three elongate rods having inner and outer ends, means on said hub member for detachably connecting the inner set of ends of said rods to said hub member with said members radiating outwardly therefrom at substantial angles relative to each other and with the outer set of ends of said rods occupying a substantially common plane, spaced-apart connector means on said sheet adjacent marginal edges thereof for connecting outer end portions of said rods to said sheet, said connector means being so positioned on the sheet that when said rod ends are connected thereto in operative positions the sheet is tensed, with said connector means comprising a spring clip secured to said sheet adapted to receive an outer end portion of a rod and frictionally hold the same, and including a pair of gripping legs normally biased to positions in angularly disposed relationship to each other, which legs are shiftable on the application of force thereto toward a more nearly parallel relationship, and upon release of such force are urged toward said normal angular disposed relationship, said gripping legs having openings extending therethrough which, when said legs are shifted toward said more parallel relationship, are sufficiently aligned to receive a rod therethrough and upon release frictionally grip said rod to hold the same therein.

17. A portable projections screen comprising a sheet of flexible material, and sheet support means including a central hub member; at least three elongate rods having inner and outer ends, a rod having a shoulder thereon spaced longitudinally inwardly from the inner end of the rod with a surface of said shoulder facing longitudinally of the rod away from said inner end; means on said hub member for detachably connecting the inner set of ends of said rods to said hub member with said members radiating outwardly therefrom at substantial angles relative to each other and with the outer set of ends of said rods occupying a substantially common plane, said means on the hub member for connecting the inner end of the rod to the hub member comprising a socket in said hub member adapted to receive said inner end of the rod, said socket including means releasably engaging said face of the shoulder to inhibit removal of a rod therefrom and means for engaging opposed sides of said rod intermediate said shoulder and inner end of the rod to inhibit lateral movement of the rod in the socket; spaced-apart connector means on said sheet adjacent marginal edges thereof for connecting outer end portions of said rods to said sheet, said connector means being so positioned on the sheet that when said rod ends are connected thereto in operative positions the sheet is tensed.

18. A portable projection screen comprising a sheet of flexible material, and sheet support means including a central hub member; at least three elongate rods having inner and outer ends, a rod being hollow at its inner end and having a portion thereon projecting radially inwardly within said hollow end of the rod; means on said hub member for detachably connecting the inner set of ends of said rods to said hub member with said members radiating outwardly therefrom at substantial angles relative to each other and with the outer set of ends of said rods occupying a substantially common plane, said means for detachably connecting the inner end of the rod to the hub member comprising an elongate projection extending radially outwardly from said hub on which said inner end of the rod is detachably received and means for releasably engaging said projecting portion of said rod to inhibit removal of the rod therefrom; spaced-apart connector means on said sheet adjacent marginal edges thereof for connecting outer end portions of said rods to said sheet, said connector means being so positioned on the sheet that when said rod ends are connected thereto in operative positions the sheet is tensed.

* * * * *